(12) United States Patent
Jhang et al.

(10) Patent No.: US 11,623,685 B2
(45) Date of Patent: Apr. 11, 2023

(54) SYSTEM AND METHOD FOR ACTIVE STEERING CONTROL WITH AUTOMATIC TORQUE COMPENSATION

(71) Applicant: AUTOMOTIVE RESEARCH & TESTING CENTER, Changhua Hsien (TW)

(72) Inventors: Tong-Kai Jhang, Changhua Hsien (TW); Jin-Yan Hsu, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 140 days.

(21) Appl. No.: 17/395,878

(22) Filed: Aug. 6, 2021

(65) Prior Publication Data
US 2021/0362781 A1    Nov. 25, 2021

Related U.S. Application Data

(63) Continuation-in-part of application No. 16/213,088, filed on Dec. 7, 2018, now abandoned.

(51) Int. Cl.
*B62D 6/00* (2006.01)
*B62D 5/04* (2006.01)

(52) U.S. Cl.
CPC ............ *B62D 6/003* (2013.01); *B62D 5/049* (2013.01)

(58) Field of Classification Search
CPC .................................. B62D 6/003; B62D 5/049
See application file for complete search history.

(56) References Cited

U.S. PATENT DOCUMENTS

| | | | |
|---|---|---|---|
| 2012/0150389 A1* | 6/2012 | Oblizajek | B62D 5/0472 701/42 |
| 2017/0088174 A1* | 3/2017 | Inoue | B62D 6/003 |
| 2017/0113717 A1* | 4/2017 | Ko | B62D 6/003 |
| 2018/0009437 A1* | 1/2018 | Ooba | B60W 30/10 |
| 2018/0265120 A1* | 9/2018 | Mardh | B62D 5/0463 |
| 2019/0337561 A1* | 11/2019 | Jiang | B62D 1/286 |

* cited by examiner

*Primary Examiner* — Rachid Bendidi
*Assistant Examiner* — Sahar Motazedi
(74) *Attorney, Agent, or Firm* — Rosenberg, Klein & Lee (57) ABSTRACT

A system and a method for active steering control with automatic torque compensation are disclosed with a processor that generates a targeted torque signal after receiving a steering assistance signal generated by an active driver assistance device, overlays the targeted torque signal on a driver's torque signal after receiving the driver's torque signal sensed by a torque sensor to generate a steering torque signal, and performs an assistance logic algorithm according to the steering torque signal. As the assistance logic algorithm is performed based on both the steering assistance signal and the driver's torque signal, the steering assistance effect provided by the system and the method will not resist against the way of driver's steering, allowing the driver to easily and stably control the vehicle.

4 Claims, 7 Drawing Sheets

SYSTEM AND METHOD FOR ACTIVE STEERING CONTROL WITH AUTOMATIC TORQUE COMPENSATION

CROSS-REFERENCE TO RELATED APPLICATIONS

This application is a continuation-in-part (CIP) application of U.S. patent application Ser. No. 16/213,088 filed on Dec. 7, 2018, which is now pending and incorporated herein by reference in the present application in its entirety.

BACKGROUND OF THE INVENTION

1. Field of the Invention

The present invention relates to a control system and a control method and, more particularly, to a system and a method for active steering control with automatic torque compensation.

2. Description of the Related Art

Nowadays, vehicles are equipped with more and more driver assistance systems to share the load of drivers in driving and secure driving in a safe and comfortable way. Among all the driver assistance systems, advanced driver assistance system (ADAS) could be the one drawing greatest attention because of its emphasis on collision prevention. For development of key technology and modules of ADAS, major international vehicle companies and automotive electronics suppliers all throw in significant amount of resources and manpower to keep up with the trend.

Each ADAS usually includes functions of adaptive cruise control (ACC), lane departure warning (LDW), blind spot detection (BSD), night vision, park assist, lane following, land keeping, and the like, and all these functions are involved with demand for active steering. When determining that risk of collision exists in driving the instant vehicle, the ADAS system will perform active steering to avoid collision.

During the course of driving, basically, it is the driver who holds the steering wheel to control where the vehicle should go. However, when performing the function of steering control, the ADAS will take control of the steering wheel to intervene in the driver's driving behavior. For example, the active steering function of the ADAS may adjust the turning angle of the steering wheel. Under the circumstance that the driver is holding the steering wheel, it may suddenly become easier or more laborious for the driver to steer when the ADAS that performs the function of active steering abruptly seizes the control of the steering wheel. It is very likely that the driver may be scared by such unexpected active steering to cause the vehicle to run into uncontrollable and even more dangerous situation in driving.

SUMMARY OF THE INVENTION

An objective of the present invention is to provide a system and a method for active steering control with automatic torque compensation capable of getting rid of the shortcoming of putting the driver under threat and/or the vehicle under the risk of loss of control when providing active steering function and ensuring that the driver can easily and stably control the vehicle while the active steering function is operating.

To achieve the foregoing objective, the system for active steering control with automatic torque compensation includes an active steering assistance device, a torque sensor, a processor, a system-related compensator, and an electric motor.

The active steering assistance device generates a steering assistance signal.

The torque sensor generates a driver's torque signal.

The processor is electrically connected to the active steering assistance device and the torque sensor, generates a targeted torque signal according to the steering assistance signal after receiving the steering assistance signal, receives the driver's torque signal, overlays the targeted torque signal on the driver's torque signal to generate a steering torque signal, and performs an assistance logic algorithm according to the steering torque signal.

The system-related compensator is electrically connected to the processor, receives a computed result after the processor performs the assistance logic algorithm, and compensates the computed result.

The electric motor is electrically connected to the system-related compensator. The system-related compensator controls a driving current for the electric motor according to the compensated computed result.

To achieve the foregoing objective, the method for active steering control with automatic torque compensation includes steps of:

receiving a steering assistance signal;

generating a targeted torque signal according to the steering assistance signal;

receiving a driver's torque signal;

overlaying the targeted torque signal on the driver's torque signal to generate a steering torque signal;

performing an assistance logic algorithm according to the steering torque signal; and outputting a computed result of the assistance logic algorithm to a system-related compensator.

The present invention employs the steering assistance signal generated by the active driver assistance device to activate the active steering function, and when the processor receives the steering assistance signal, instead of directly controlling the electric motor according to the steering assistance signal, the processor first overlays the targeted torque signal on the driver's torque signal for an estimated torque and a torque exerted by the driver overlaid each other, and then performs the assistance logic algorithm. Eventually, the processor transmits the computed result of performing the assistance logic algorithm to the system-related compensator for vehicle-dependent compensation, and then generates the driving current for the electric motor to perform steering assistance control.

Owing to the driving current for the electric motor that is generated according to the computed result of performing the assistance logic algorithm, the assistance logic algorithm can compute according to both the steering assistance signal generated by the active driver assistance device and the driver's torque signal generated by driver's steering action at the same time, such that the steering assistance effect provided by the present invention will not interfere with and resist against the way of driver's steering motion and the driver can easily and stably control the vehicle.

Other objectives, advantages and novel features of the invention will become more apparent from the following detailed description when taken in conjunction with the accompanying drawings.

DETAILED DESCRIPTION OF THE INVENTION

Figure 1:
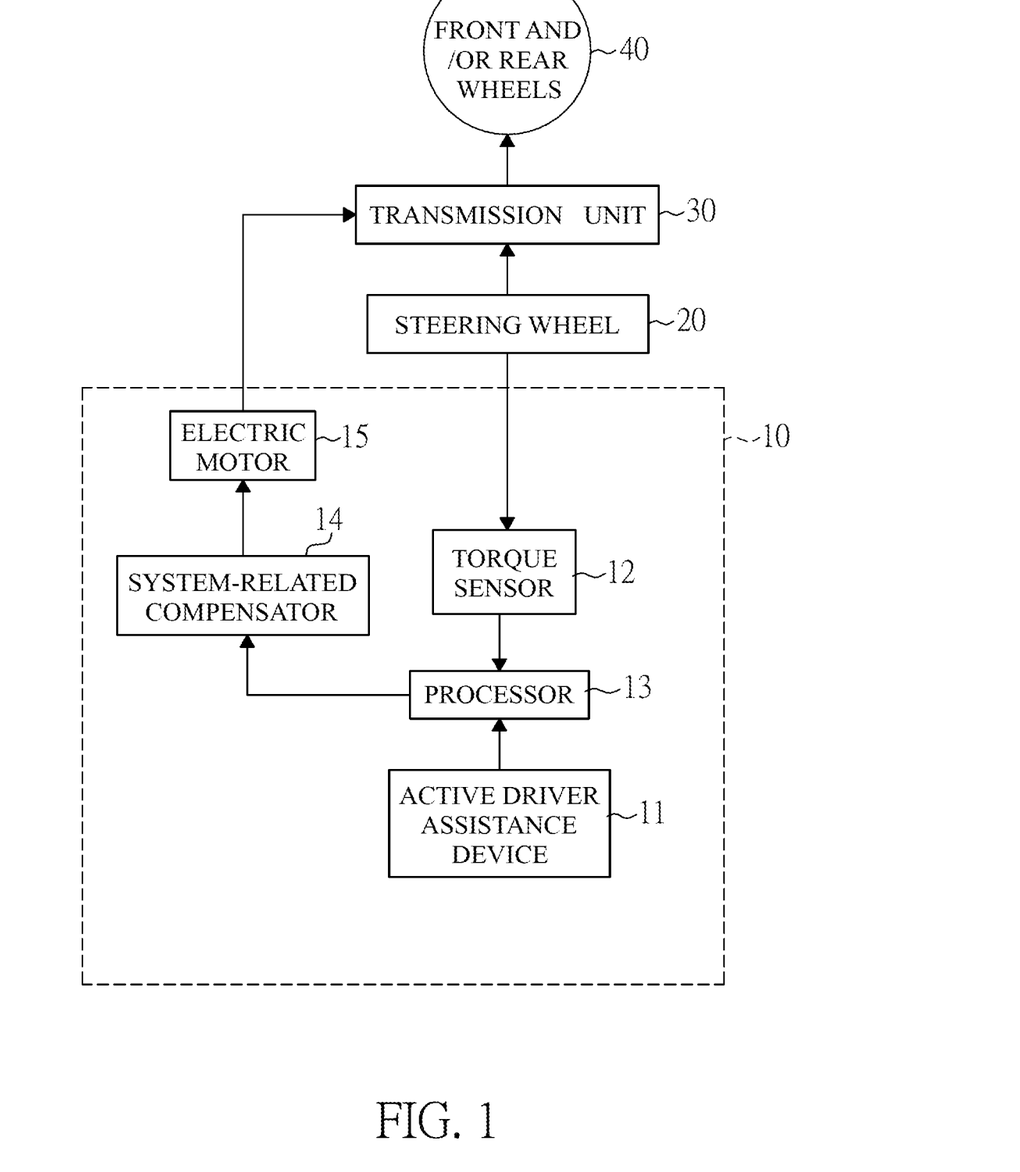
FIG. 1 is a functional block diagram of a first embodiment of a system for active steering control with automatic torque compensation in accordance with the present invention.

With reference to FIG. 1, a first embodiment of a system for automatic steering control with automatic torque compensation 10 in accordance with the present invention includes an active driving assistance device 11, a torque sensor 12, a processor 13, a system-related compensator 14, and an electric motor 15. The active driving assistance device 11 serves to sense a driving status of an instant vehicle and generate a steering assistance signal when it is necessary to make a request for active steering. For example, the active steering assistance device 11 is an advanced driver assistance system (ADAS), which uses a variety of sensors to sense conditions of an environment surrounding an instant vehicle, performs data processing according to sensed results, and generates a corresponding steering assistance signal for the driver to refer to for control over the instant vehicle or to directly perform steering assistance control over the instant vehicle for risk avoidance. In the present embodiment, the active driving assistance device 11 can detect the current conditions of the environment around the instant vehicle through radar or image sensor. In the event that the request for active steering is made because of obstruction in the nearby or lane departure in driving, the active driving assistance device 11 then can generate the steering assistance signal.

The torque sensor 12 is connected to a steering wheel 20 of the instant vehicle to sense a torque exerted by a driver who currently controls the steering wheel 20 in generation of a driver's torque signal.

The processor 13 is electrically connected to the active driving assistance device 11 and the torque sensor 12. When receiving the steering assistance signal generated by the active driving assistance device 11, the processor 13 generates a targeted torque signal according to the steering assistance signal. The processor 13 further receives the driver's torque signal generated by the torque sensor 12 to overlay the targeted torque signal on the driver's torque signal so as to generate a steering torque signal, and performs an assistance logic algorithm according to the steering torque signal.

The system-related compensator 14 is electrically connected to the processor 13, receives a computed result generated by performing the assistance logic algorithm from the processor 13, and compensates the computed result.

The electric motor 15 is electrically connected to the system-related compensator 14. The system-related compensator 14 controls a driving current of the electric motor 15 according to the compensated computed result to drive the electric motor 15 for operation and provide an auxiliary torque to a transmission unit 30 of the instant vehicle, such that a torque facilitating the driver to steer front and/or rear wheels 40 of the instant vehicle can be provided to change a moving path of the instant vehicle.

Figure 2:
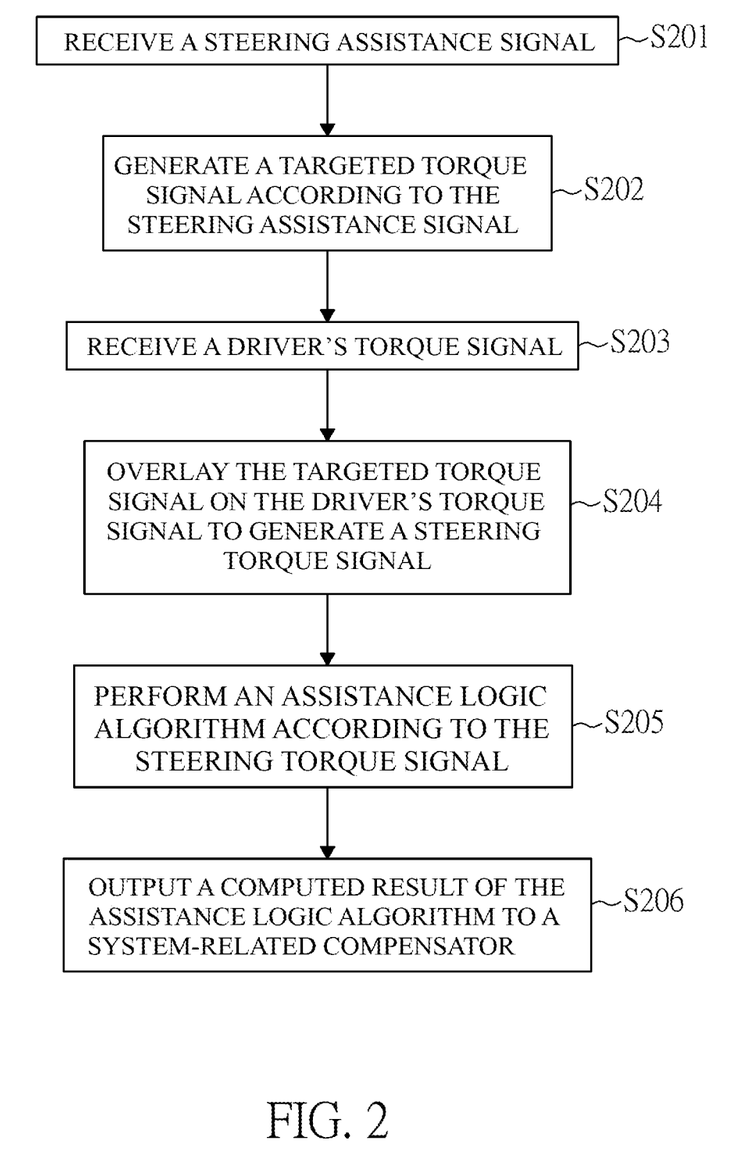
FIG. 2 is a flow diagram of a first embodiment of a method for active steering control with automatic torque compensation in accordance with the present invention.

Furthermore, with reference to FIG. 2, a first embodiment of a method for active steering control with automatic torque compensation in accordance with the present invention is performed by the processor 13 of the foregoing system for active steering control with automatic torque compensation and includes the following steps.

Step S201: Receive a steering assistance signal.

Step S202: Generate a targeted torque signal according to the steering assistance signal.

Step S203: Receive a driver's torque signal.

Step S204: Overlay the targeted torque signal on the driver's torque signal to generate a steering torque signal.

Step S205: Perform an assistance logic algorithm according to the steering torque signal.

Step S206: Output a computed result of the assistance logic algorithm to a system-related compensator.

In the present embodiment, the processor 13 is a processor of an electric power steering system. The electric power steering system is provided to adjust an auxiliary torque generated by the transmission unit 30 for assisting the driver's control over the steering wheel 20 easily and stably in steering the front and/or rear wheels 40. In general, under the circumstance that the instant vehicle is driven at a low speed, the electric power steering system tends to provide a larger auxiliary torque while under the circumstance that the instant vehicle is driven at a high speed, the electric power steering system tends to reduce the auxiliary torque to avoid the danger arising from an uncontrollable vehicle attributable to a very light steering wheel controlled by an excessive torque.

In sum, the steering assistance signal generated by the active driving assistance device 11 is to activate an active steering function. When receiving the steering assistance signal, instead of directly controlling the electric motor according to the steering assistance signal, the processor 13, by way of overlaying the targeted torque signal on the driver's torque signal, lets the active steering function calculate the overlaid torque signal for an estimated torque and a torque exerted by the driver overlaid each other and then perform the assistance logic algorithm. After transmitting the computed result of the assistance logic algorithm to the system-related compensator 14 for vehicle-dependent compensation, the processor 13 further generates the driving current for the electric motor 15 to perform the steering assistance control.

As the assistance logic algorithm of the processor 13 is designed based on the power steering system and performs computation according to both the steering assistance signal generated by the active driving assistance device 11 and the driver's torque signal generated by driver's steering motion, the steering assistance effect provided by the present invention won't interfere with and resist against driver's control over the steering wheel, thereby allowing the driver to easily and stably control steering of the vehicle.

Figure 3:
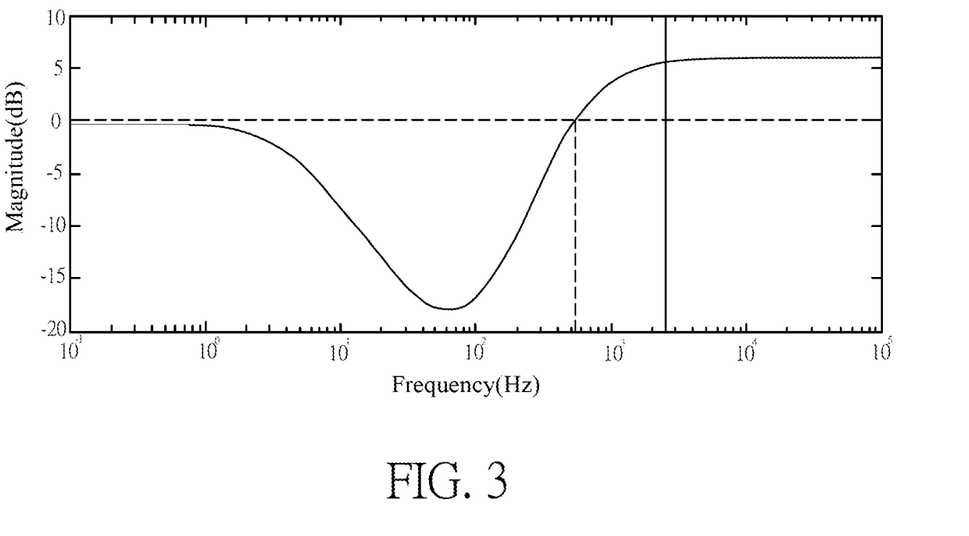
FIGS. 3 and 4 are frequency response diagrams of a system-related compensator of the system in FIG. 1.
Figure 4:
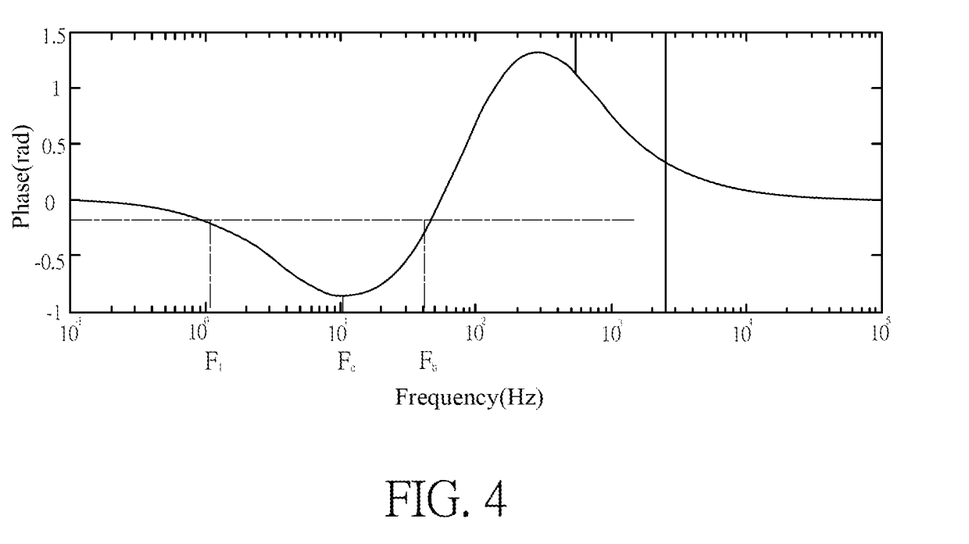

With reference to FIGS. 3 and 4, a frequency response diagram of the dynamic toque compensator 14 performs compensation on the computed result of the assistance logic algorithm according to the following equation.

$$SC(z) = \frac{B_1 + B_2 z^{-1} + B_3 z^{-2} + B_4 z^{-3}}{A_1 + A_2 z^{-1} + A_3 z^{-2} + A_4 z^{-3}}$$

where $A_n$ and $B_n$ are related to adjustment parameters for various vehicles to strengthen robustness and stability of the system.

FIG. 4 shows frequency response diagram of the output current of the electric motor 15, by giving three frequencies $F_1$, $F_c$ and $F_h$, the phases corresponding to the frequencies $F_1$, $F_c$ and $F_h$ can be obtained. A standard transfer function (TF) of the dynamic torque compensator 14 can be expressed by equation as follow:

$$TF = \frac{D_1 S^3 + D_2 S^2 + D_3 S + D_4}{C_1 S^3 + C_2 S^2 + C_3 S + C_4}$$

The zeros and poles of the transfer function (TF) can be obtained through empirical rule to determine prober values of D1, D2, D3, C1, C2 and C3. When the transfer function (TF) is determined, the transfer function (TF) is further discretized to obtain the equation:

$$SC(z) = \frac{B_1 + B_2 z^{-1} + B_3 z^{-2} + B_4 z^{-3}}{A_1 + A_2 z^{-1} + A_3 z^{-2} + A_4 z^{-3}}$$

Figure 5:
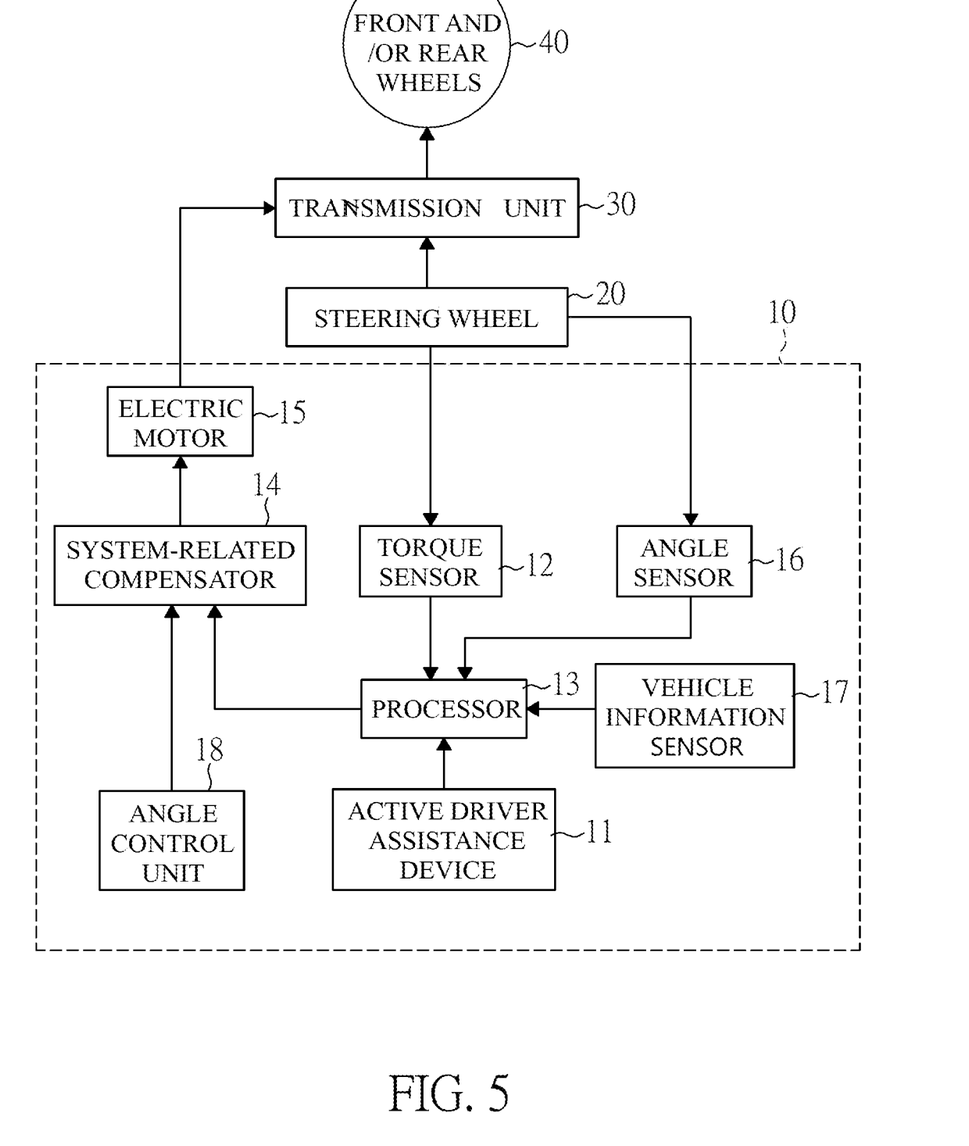
FIG. 5 is a functional block diagram of a second embodiment of a system for active steering control with automatic torque compensation in accordance with the present invention.

With reference to FIG. 5, a second embodiment of a system for automatic steering control with automatic torque compensation 10 in accordance with the present invention includes an angle sensor 16, a vehicle information sensor 17 and an angle control unit 18.

The angle sensor 16 serves to sense a rotation angle of the steering wheel 20 in generation of an angle signal. The vehicle information sensor 17 serves to sense the vehicle and generates sideways displacement information.

Figure 7:
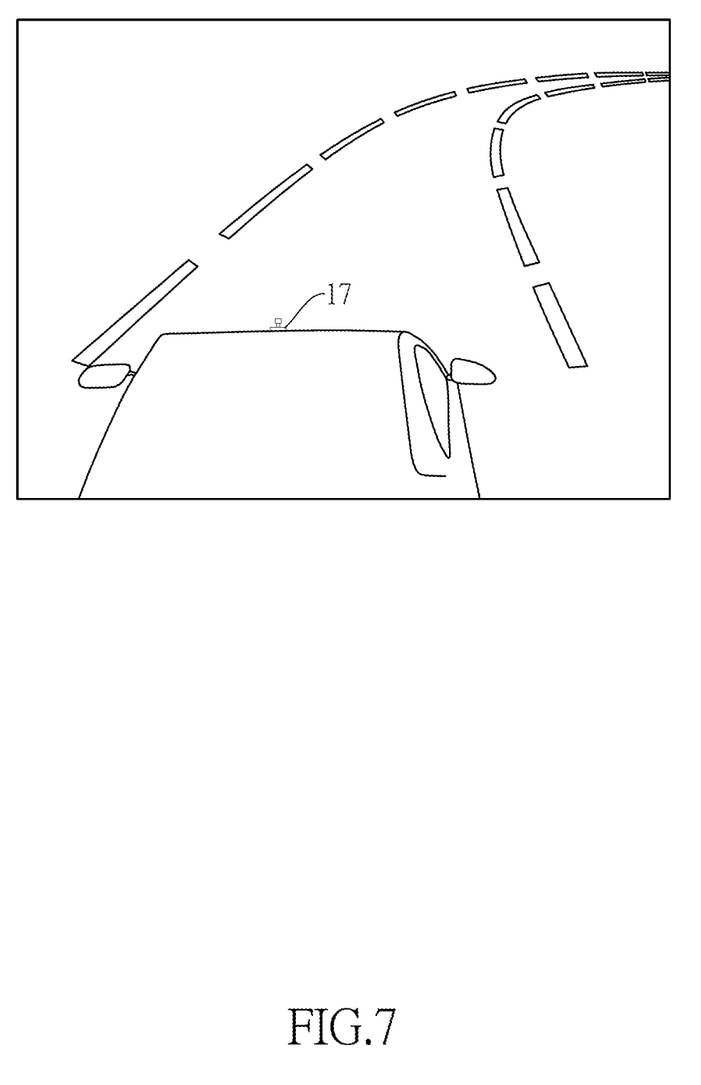
FIG. 7 shows a vehicle information sensor mounted in a front portion of a vehicle to sense vehicle sideways displacement information in accordance with the present invention.

In one embodiment, the vehicle information sensor 17 is an intelligent camera (smart camera) mounted in front of a vehicle as shown in FIG. 7, the intelligent camera captures road images containing information of road surface makings. By using well known image recognizing technologies, the lanes in front of the vehicle can be identified. Therefore, by comparing consecutive road images, a shift distance of the vehicle relative to the road surface makings can be obtained. Accordingly, the sideways displacement information can be obtained based on the captured information of the intelligent camera.

In another embodiment, the vehicle information sensor 17 is a global positioning system (GPS) receiver mounted in the vehicle to consecutively record and store the coordinates data of the vehicle. By comparing the consecutively recorded coordinates data of the vehicle, the sideways displacement information of the vehicle can be obtained based on differences of the coordinates data.

In yet another embodiment, the vehicle information sensor 17 may be an inertial measurement unit (IMU) including accelerometers, gyroscopes and magnetometers to sense the angular velocity and acceleration of the vehicle. Alternatively, the vehicle information sensor 17 may be a 3-axis accelerometer and gyro sensor to measure the angular velocity and acceleration of the vehicle. By comparing and processing the angular velocity and acceleration of the vehicle being sensed at different time, the sideways displacement information can be obtained.

In yet another embodiment, the vehicle information sensor 17 may be a combination selected from the foregoing intelligent camera, the GPS receiver, the IMU and the 3-axis accelerometer and gyro sensor.

The angle control unit 18 is electrically connected to the system-related compensator 14 and serves to generate the driving current of the electric motor through the system-related compensator 14 and control the rotation angle of the steering wheel through the electric motor 15 and the transmission unit 30.

The processor 13 is further electrically connected to the angle sensor 15, the vehicle information sensor 17 and the angle control unit 18.

When receiving the steering assistance signal, the processor 13 first controls the steering wheel 20 to rotate to a targeted rotation angle according to the steering assistance signal through the angle control unit 18, and determines whether a sideways displacement of the vehicle reaches a targeted displacement according to the sideways displacement information generated by the vehicle information sensor 17.

When the sideways displacement of the vehicle does not reach the targeted displacement, the processor 13 adjusts the steering assistance signal according to a difference between the sideways displacement and the targeted displacement, and controls the rotation angle of the steering wheel 20 again through the angle control unit 18 according to adjusted steering assistance signal.

When the sideways displacement of the vehicle reaches the targeted displacement, the processor 13 further determines whether it is a driver's steering status now according to the driver's torque signal generated by the torque sensor 12. For example, when the torque sensor 12 senses that the steering wheel 20 is subject to a force and is rotated, it indicates that the driver is controlling the steering wheel 20 for steering and the steering status is the driver's steering status.

When it is the driver's steering status, the processor 13 receives a current angle signal generated by the angle sensor 16 to sense a current rotation angle of the steering wheel 20, calculates an angular error between the current rotation angle and a targeted rotation angle according to the current angle signal, and further generates the targeted torque signal according to the angular error.

When it is not the driver's steering status, the processor 13 receives the steering assistance signal again.

Figure 6A:
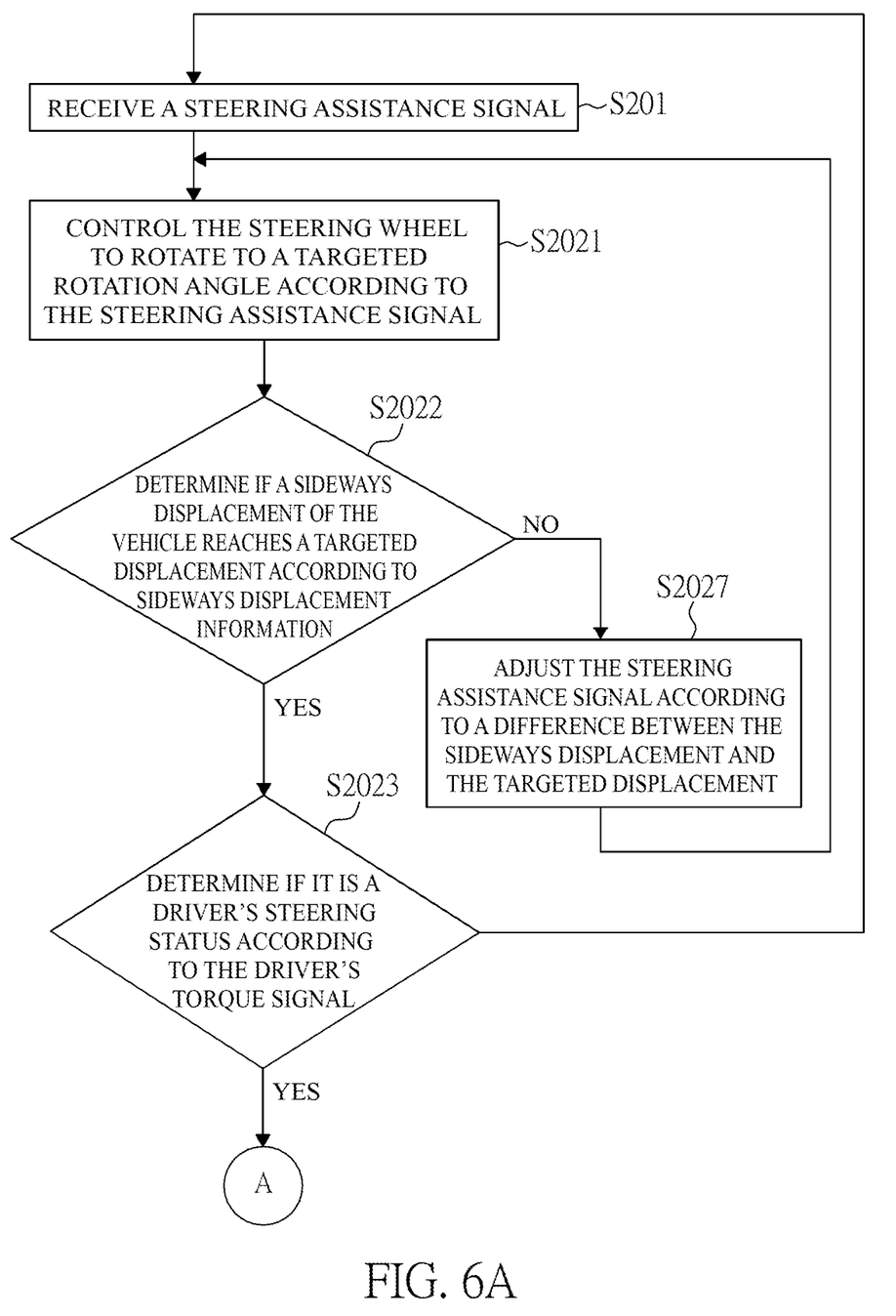
FIGS. 6A and 6B are flow diagrams of a second embodiment of a method for active steering control with automatic torque compensation in accordance with the present invention.
Figure 6B:
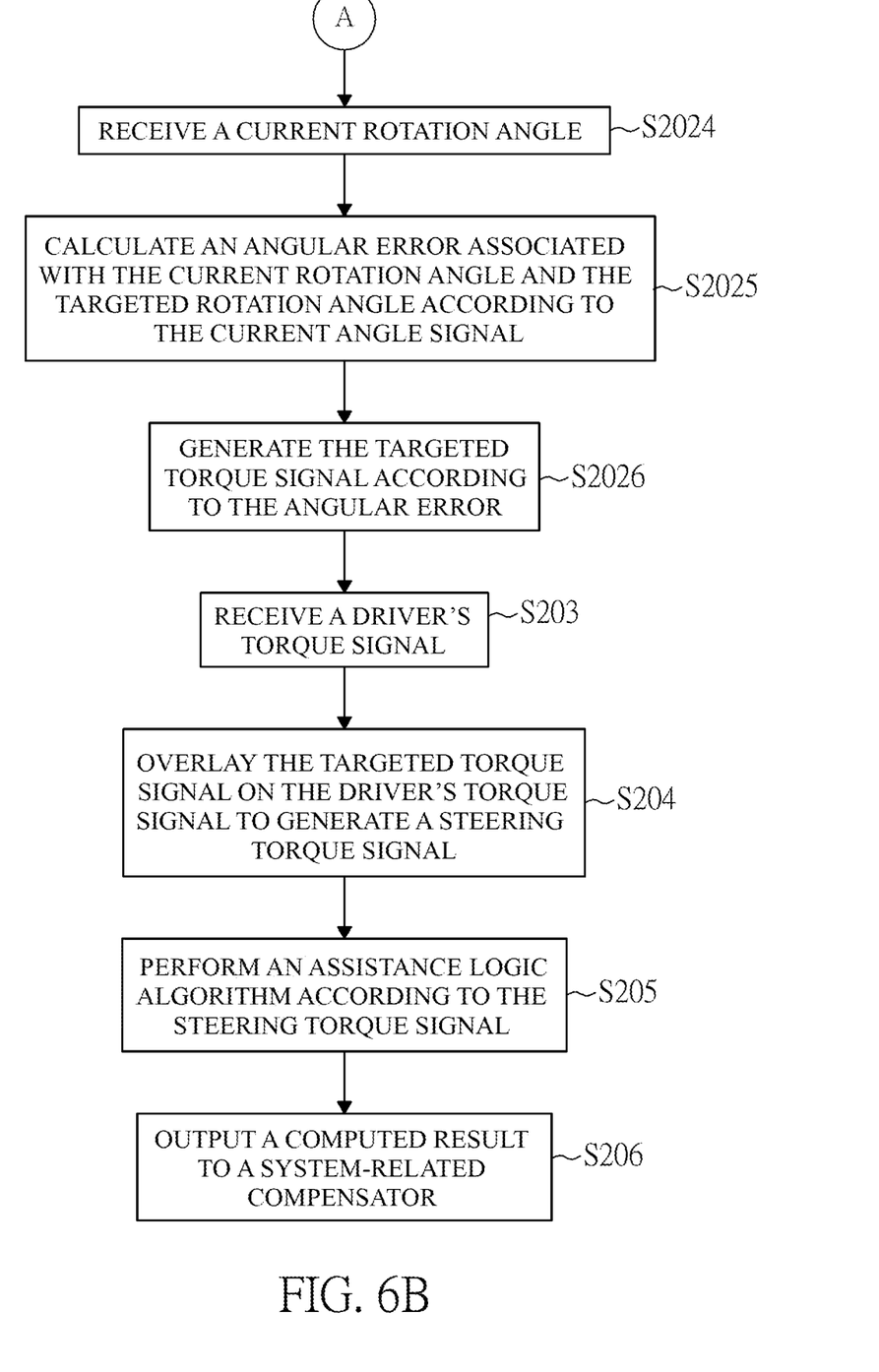

Furthermore, with reference to FIGS. 6A and 6B, a first embodiment of a method for active steering control with automatic torque compensation in accordance with the present invention is performed by the processor 13 of the foregoing system, and differs from the first embodiment of the method in step S202, which includes the following sub-steps.

Step S2021: Control the steering wheel to rotate to a targeted rotation angle through an angle control unit according to the steering assistance signal.

Step S2022: Determine if a sideways displacement of the vehicle reaches a targeted displacement according to sideways displacement information generated by a vehicle information sensor. When the sideways displacement reaches the targeted displacement, perform step S2023. Otherwise, perform step S2027.

Step S2023: Determine if it is a driver's steering status according to the driver's torque signal generated by a torque sensor. When it is the driver's steering status, perform step S2024. Otherwise, resume step S201.

Step S2024: Receive a current rotation angle of the steering wheel sensed by the angle sensor and generate a current angle signal.

Step S2025: Calculate an angular error associated with the current rotation angle and the targeted rotation angle according to the current angle signal.

Step S2026: Generate the targeted torque signal according to the angular error.

Step S2027: Adjust the steering assistance signal according to a difference between the sideways displacement and the targeted displacement and resume step S2021.

By and large, when the rotation angle of the steering wheel 20 reaches the targeted rotation angle, the sideways displacement of the vehicle should be equal to the targeted displacement. However, while a vehicle is moving, the vehicle may have different sideways displacements as varying with road conditions, conditions of all persons on board, and conditions of suspension systems. There are chances that the sideways displacement is not equal to the targeted displacement when the steering angle of the steering wheel 20 is equal to the targeted rotation angle. Hence, the processor 13 determines if the sideways displacement of the vehicle reaches the targeted displacement according to the sideways displacement information generated by the vehicle information sensor 17. When the sideways displacement of the vehicle does not reach the targeted displacement, the processor 13 repeatedly adjusts the steering assistance signal according to the difference between the sideways displacement and the targeted displacement and corrects the rotation angle of the steering wheel 20 according to the rotation angle of the steering wheel controlled by the adjusted steering assistance signal until the sideways displacement of the vehicle reaches the targeted displacement.

Moreover, the processor 13 further determines if it is the driver's steering status according to the driver's torque signal generated by the torque sensor 12. When it is the driver's steering status, the processor 13 performs the subsequent assistance logic algorithm. When it is not the driver's steering status, the processor 13 skips the subsequent assistance logic algorithm to reduce the computation overhead of the processor 13 for assurance of higher processing efficiency of the processor 13.

In the present embodiment, conversion between the angular error and the targeted torque signal can be referred to a lookup table created through experiments.

Meanwhile, in other embodiments, the sideways displacement of the vehicle is calculated according to an equation for a model representative of spatial state of lateral movement of a vehicle as follows.

$$\begin{bmatrix} \dot{y} \\ \dot{v}_y \\ \dot{\psi} \\ \dot{r} \end{bmatrix} = \begin{bmatrix} 0 & 1 & v_x & 0 \\ 0 & \frac{-C_{\alpha f}+C_{\alpha r}}{mv_x} & 0 & \frac{bC_{\alpha r}-aC_{\alpha f}}{mv_x}-v_x \\ 0 & 0 & 0 & 1 \\ 0 & \frac{bC_{\alpha r}-aC_{\alpha f}}{I_z v_x} & 0 & \frac{-(a^2 C_{\alpha f}+b^2 C_{\alpha r})}{I_z v_x} \end{bmatrix} \begin{bmatrix} y \\ v_y \\ \psi \\ r \end{bmatrix} + \begin{bmatrix} 0 \\ \frac{C_{\alpha f}}{m} \\ 0 \\ \frac{aC_{\alpha f}}{I_z} \end{bmatrix} \delta_f$$

wherein a relationship between a yaw rate (r) and a steering angle of the front wheel can be expressed below.

$$\delta_f = \dot{\psi} \frac{L\left(1+\frac{v_x^2}{v_{ch}^2}\right)}{v_x}$$

where $v_{ch}$: Vehicle speed;
$v_x$: Vehicle speed in a longitudinal direction;
$v_y$: Vehicle speed in a lateral direction;
$C_{\alpha f}$: Cornering stiffness of front wheel;
$C_{\alpha r}$: Cornering stiffness of rear wheel;
m: Mass of the vehicle;
L: Length of the vehicle;
a: Length from front axle to the center of gravity of the vehicle;
b: Length from rear axle to the center of gravity of the vehicle;
I: Moment of inertia;
y: Lateral displacement of the vehicle;
$\psi$: Yaw angle;
r: Yaw rate ($\dot{\psi}$); and
$\delta_f$: Steering angle of front wheel.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system for active steering control with automatic torque compensation, comprising:
   an active steering assistance device generating a steering assistance signal;
   a torque sensor generating a driver's torque signal;
   a processor electrically connected to the active steering assistance device and the torque sensor, generating a targeted torque signal according to the steering assistance signal after receiving the steering assistance signal, receiving the driver's torque signal, overlaying the targeted torque signal on the driver's torque signal to generate a steering torque signal, and performing an assistance logic algorithm according to the steering torque signal;
   an angle sensor electrically connected to the processor, adapted to sense a rotation angle of a steering wheel, and generating an angle signal;
   a vehicle information sensor electrically connected to the processor, adapted to sense a vehicle, and generating sideways displacement information of the vehicle;
   a system-related compensator electrically connected to the processor, receiving a computed result after the processor performs the assistance logic algorithm, and compensating the computed result; and
   an electric motor electrically connected to the system-related compensator, wherein the system-related compensator controls a driving current for the electric motor according to the compensated computed result;
   wherein
   when receiving the steering assistance signal, the processor first controls the rotation angle of the steering wheel to reach a targeted rotation angle according to the steering assistance signal, and determines if a sideways displacement of the vehicle reaches a targeted displacement according to the sideways displacement information generated by the vehicle information sensor;
   when the sideways displacement of the vehicle reaches the targeted displacement, the processor determines if the vehicle is at a driver's steering status according to the driver's torque signal generated by the torque sensor;

when the vehicle is at the driver's steering status, the processor receives a current angle signal from the angle sensor when the angle sensor senses a current rotation angle of the steering wheel, calculates an angular error associated with the current rotation angle and the targeted rotation angle according to the current angle signal, and generates the targeted torque signal according to the angular error; and when the sideways displacement of the vehicle does not reach the targeted displacement, the processor adjusts the steering assistance signal to an adjusted steering assistance signal according to a difference between the sideways displacement and the targeted displacement, and controls the rotation angle of the steering wheel according to the adjusted steering assistance signal.

2. The system as claimed in claim 1, wherein when the vehicle is not at the driver's steering status, the processor receives the steering assistance signal again.

3. A method for active steering control with automatic torque compensation, comprising steps of:

receiving a steering assistance signal;

generating a targeted torque signal according to the steering assistance signal;

receiving a driver's torque signal;

overlaying the targeted torque signal on the driver's torque signal to generate a steering torque signal;

performing an assistance logic algorithm according to the steering torque signal; and outputting a computed result of the assistance logic algorithm to a system-related compensator;

wherein the step of generating the targeted torque signal according to the steering assistance signal further comprises steps of:

controlling a steering wheel of a vehicle to rotate to a targeted rotation angle according to the steering assistance signal;

determining if a sideways displacement of the vehicle reaches a targeted displacement according to sideways displacement information generated by a vehicle information sensor;

wherein when the sideways displacement reaches the targeted displacement, determining if the vehicle is at a driver's steering status according to the driver's torque signal generated by a torque sensor;

wherein when the vehicle is at the driver's steering status, receiving a current rotation angle of the steering wheel sensed by an angle sensor and generating a current angle signal;

calculating an angular error associated with the current rotation angle and the targeted rotation angle according to the current angle signal; and generating the targeted torque signal according to the angular error;

wherein when the sideways displacement does not reach the targeted displacement, the method further comprises adjusting the steering assistance signal to an adjusted steering assistance signal according to a difference between the sideways displacement and the targeted displacement and resuming the step of controlling the steering wheel to rotate to the targeted rotation angle according to the adjusted steering assistance signal.

4. The method as claimed in claim 3, wherein when the vehicle is not at the driver's steering status, the method further comprises resuming the step of receiving the steering assistance signal.

\* \* \* \* \*